(12) United States Patent
Schmale

(10) Patent No.: US 6,803,948 B1
(45) Date of Patent: Oct. 12, 2004

(54) TELEVISION CAMERA WITH OFF-LINE PARAMETER ADJUSTMENT

(75) Inventor: Peter C. Schmale, Breda (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/347,215

(22) Filed: Jul. 2, 1999

(30) Foreign Application Priority Data

Jul. 2, 1998 (EP) .............................. 98202228

(51) Int. Cl.[7] ................. H04N 5/228; H04N 5/225; H04N 5/232; H04N 7/14
(52) U.S. Cl. ................. 348/222.1; 348/220.1; 348/211.99; 348/14.14
(58) Field of Search ................. 348/220.1, 333.01, 348/333.12, 222.1, 211.99, 14.14, 14.15

(56) References Cited

U.S. PATENT DOCUMENTS

| | | | | | |
|---|---|---|---|---|---|
| 4,172,264 | A | * | 10/1979 | Taylor et al. | 348/722 |
| 4,272,787 | A | * | 6/1981 | Michael et al. | 348/559 |
| 4,755,873 | A | * | 7/1988 | Kobayashi | 348/74 |
| 4,803,550 | A | * | 2/1989 | Yabe et al. | 348/68 |
| 4,823,285 | A | * | 4/1989 | Blancato | 345/630 |
| 4,888,605 | A | * | 12/1989 | Matsumoto | 396/429 |
| 4,888,795 | A | * | 12/1989 | Ando et al. | 348/14.14 |
| 4,996,592 | A | * | 2/1991 | Yoshida | 348/14.12 |
| 5,373,317 | A | * | 12/1994 | Salvati et al. | 348/65 |
| 5,519,448 | A | | 5/1996 | Nagasawa et al. | 348/559 |
| 5,617,136 | A | * | 4/1997 | Iso et al. | 348/71 |
| 5,621,492 | A | * | 4/1997 | Beveridge et al. | 396/2 |
| 5,648,818 | A | * | 7/1997 | Fukatsu | 348/273 |
| 5,691,767 | A | * | 11/1997 | Tahara | 375/240.01 |
| 5,815,199 | A | * | 9/1998 | Palm et al. | 348/143 |
| 5,822,013 | A | * | 10/1998 | Chung | 348/559 |
| 6,172,706 | B1 | * | 1/2001 | Tatsumi | 348/169 |
| 2002/0030834 | A1 | * | 3/2002 | Watanabe et al. | 358/1.9 |

* cited by examiner

Primary Examiner—Andrew Christensen
Assistant Examiner—Nhan Tran
(74) Attorney, Agent, or Firm—Aaron Waxler

(57) ABSTRACT

An image camera (e.g. a professional or consumer camera/camcorder, an electronic still picture camera) comprises a frame memory (82) between its image sensor (2) and an electronic signal-processing circuit (3). A scene can be "frozen" in response to a remote control command (91). Critical adjustments (e.g. skin colour) can now be carried out without requiring persons acting in the scene to stand still. Adjustments can also be carried out on the basis of an image in which the camera operator himself acts in the scene.

7 Claims, 1 Drawing Sheet

TELEVISION CAMERA WITH OFF-LINE PARAMETER ADJUSTMENT

FIELD OF THE INVENTION

The invention relates to an image camera comprising an image sensor for generating image signals representative of images picked up by said image sensor; a signal processor for processing said image signal to obtain an adjusted video signal in accordance with adjustment parameters, and means for generating said adjustment parameters. The invention also relates to a method of adjusting such a television camera.

BACKGROUND OF THE INVENTION

Image cameras as defined in the opening paragraph are generally known. An example of a commercially available professional television camera is the LDK100 of Philips Digital Video Systems.

Television cameras, both professional and consumer cameras, require a number of parameters to be controlled. Parameters such as zoom, focus, iris, etc. relate to the optical path of the camera. Parameters such as white balance, gamma, contour, etc. relate to the electrical video processing. Some parameters are continuously controlled during operation. Other parameters need to be adjusted once in a set-up procedure before the camera is put into operation. The latter adjustments may require a specific test image. For example, white balance is adjusted using a white test card, and contour is adjusted using a frequency pattern card. Other adjustments require a real image. For example, a skin detection circuit in the camera is to be adjusted in such a way that a person's skin colour is distinctly different from other colours in the scene. The adjustment parameters are then fixedly stored until external conditions change. The set-up procedure requires the controlling person to see the results of his adjustments in the viewfinder or on a monitor.

A drawback of the known set-up procedure is that the person acting before the camera has to stand still for a while. Further, there is a tendency in electronic news gathering to make a single person responsible for both recording the scene and acting in the scene (for example, conducting an interview). In such operation conditions, the set-up procedure requires the video reporter himself to act in the scene before the camera lens and simultaneously adjust the camera. Needless to say that this poses a problem.

SUMMARY OF THE INVENTION

It is an object of the invention to provide an improved image camera which alleviates the above-mentioned drawback.

To this end, the image camera in accordance with the invention comprises a memory circuit connected between said image sensor and said signal processor, which memory circuit is arranged to store the image signal in response to a first user-operable control command and repeatedly apply the stored image signal to the signal processor until receipt of a second user-operable control command.

The invention provides the possibility of "freezing" the image (or even a sequence of images if the memory has a large capacity) as picked-up by the image sensor. The camera can then be adjusted on the basis of the frozen image. For example, the video reporter may freeze an image of himself and then adjust the skin detection circuit while observing the result in the viewfinder.

In an embodiment of the invention, the camera comprises a remote control receiver arranged to receive at least the first user-operable command from a remote control transmitter.

Advantageously, the memory is further arranged to also perform other functions such as scan format conversion and frame rate conversion.

BRIEF DESCRIPTION OF THE DRAWINGS

The FIGURE shows schematically a diagram of a television camera in accordance with the invention.

DESCRIPTION OF EMBODIMENTS

Figure 1:
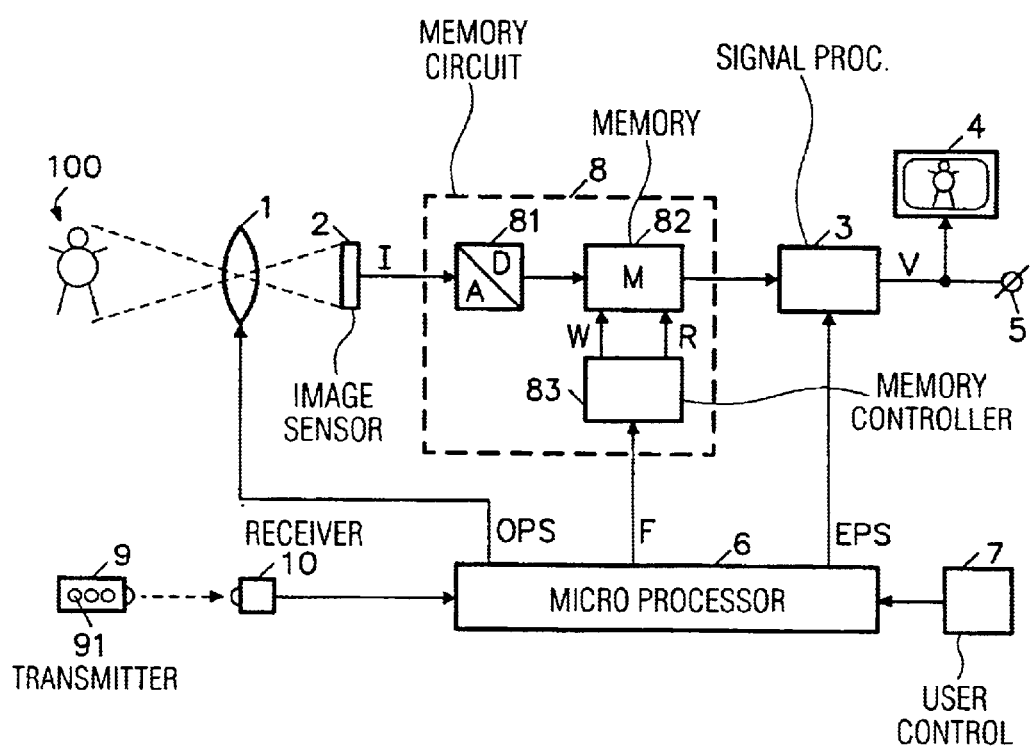

The FIGURE shows schematically a diagram of a television camera in accordance with the invention. The camera comprises a lens system 1, an image sensor 2 (for example, a CCD sensor), a signal-processing circuit 3, a viewfinder 4, a video output terminal 5, a microprocessor 6, and user-operable control means 7 connected to the microprocessor 6 for controlling the camera. The user-operable control means 7 may be fixedly attached to the camera body or located in a central control room and connected to the camera through a communication system.

The elements mentioned so far collectively constitute a prior-art professional TV camera such as the model LDK100 of Philips Broadcast Television Systems and are known in the art. In operation, an optical image 100 is projected by the lens system 1 on the image sensor 2 and converted into an electric image signal I. A single image signal I is shown in the FIGURE, but it will be appreciated that there are image signals representing the red, green and blue components, respectively, of a coloured image. In the prior-art camera, the image signal I is directly (or through a linear amplifier, not shown) applied to the signal-processing circuit 3. The signal-processing circuit processes the image signal in accordance with electrical parameter settings EPS such as white balance, gamma, contour, etc. The electrical parameter settings EPS are received from the microprocessor 6 and can be modified by the operator through input control means 7. In a similar manner, optical parameter settings OPS such as zoom, focus, iris, etc. are supplied by the microprocessor 6 to the optical lens system 1. The effect of changing electrical and optical parameters in response to operator commands is shown in the viewfinder.

In accordance with the invention, the camera further comprises a memory circuit 8 which includes an analog-to-digital (A/D) converter 81, a frame memory 82 and a memory controller 83. The memory circuit 8 is connected between the image sensor 2 (or the linear amplifier immediately following the sensor) and the signal processing circuit 3 so that an image stored in the frame memory 82 is not influenced by the electrical parameter settings EPS. Thus, the signal processing circuit is controlled by the electric adjustment parameter settings independently of the memory circuit 8. The signal processing circuit 3 is a digital signal processor. The A/D converter 81 has sufficient resolution (for example, 12 bits) to allow digital signal processing with adequate accuracy.

The memory controller 83 receives a freeze control signal F from the microprocessor 6, and applies write control signals W and read control signals R to the frame memory. More particularly, if the freeze control signal becomes active (F=1), the current image I is written into the frame memory 82. The stored image is then repeatedly (i.e. at the frame rate) read out and applied to the signal-processing circuit 3 as long as the freeze control signal remains active. In this "freeze" mode, the electrical parameters EPS can be adjusted by the operator on the basis of a frozen input image. If the freeze control signal is inactive (F=0), the memory controller 83 establishes a direct connection between the A/D converter 81 and the signal-processing circuit 3 (possibly with a one-frame delay), and the camera operates in the conventional mode. Practical embodiments of such a memory circuit 8 are well-known in the field of television.

The freeze mode is activated in response to a user-operable command. To allow the operator to freeze an image while he is himself part of the scene, the camera further comprises a remote control receiver 10 for receiving wireless command signals from a remote control transmitter 9. In the embodiment shown in the FIGURE, the remote control transmitter 9 includes a freeze/unfreeze toggle button 91 for that purpose. The video reporter may now take a position before the camera, freeze the picture showing himself, and go back to the camera to carry out adjustments such as skin detection while viewing the result on the viewfinder or monitor.

The memory 82 is preferably a full-frame memory. However, for adjusting the electrical parameters, it is sufficient that a substantial part of the image can be frozen. In that case, the memory capacity is proportionally smaller. The memory may also have the capacity for storing a sequence of frames, i.e. a moving scene. That would enable adjusting video parameters which relate to, or are affected by, motion in the scene (e.g. motion compensation).

The memory circuit 8 may also be used to implement other memory-based features which are known per se, provided that such features do not require video signal already processed. Examples are conversion from progressive scan to interlaced scanning, frame rate conversion, and electronic still picture recording.

In summary, an image camera (e.g. a professional or consumer camera/camcorder, an electronic still picture camera) is disclosed which comprises a frame memory (81) between its image sensor (2) and electronic signal processing circuit (3). The invention allows a scene to be "frozen" in response to a remote control command (91). Critical adjustments (e.g. skin colour) can now be carried out without requiring persons acting in the scene to stand still for a while. Adjustments can also be carried out on the basis of an image in which the camera operator himself in the scene.

What is claimed is:

1. An image camera comprising:
   an image sensor for generating image signals representative of images picked-up by said image sensor;
   a signal processor for processing said image signals to obtain an adjusted video signal (V) in accordance with electric adjustment parameters (EPS);
   means for generating and supplying said electric adjustment parameters to the signal processor; wherein the image camera comprises a memory circuit connected between said image sensor and said signal processor, wherein the memory circuit is arranged to store the image signals in response to a first user-operable control command and repeatedly apply the stored image signals to the signal processor until receipt of a second user-operable control command, wherein the memory circuit includes a memory device for storing the image signals and a memory controller for the memory device, the adjustment parameter generating means comprises a microprocessor for control of the memory device independently of the electric adjustment parameters and for control of the signal processor via the adjustment parameters, and wherein user-operable input control means are coupled to the microprocessor by which the adjustment parameters can be modified by the camera operator, the microprocessor supplies a freeze control signal to the memory controller to establish a freeze mode, wherein, in the freeze mode, the adjustment parameters are adjustable by the camera operator based upon a frozen input image in the memory device, and in the absence of the freeze control signal, the memory controller establishes a connection between the image sensor and the signal processor that bypasses the memory device.

2. A camera as claimed in claim 1, further comprising a remote control receiver arranged to receive at least the first user-operable command from a remote control transmitter, and the memory circuit operates independently of the electric adjustment parameters.

3. A camera as claimed in claim 1, wherein said memory circuit is further arranged to perform scan format conversion.

4. A camera as claimed in claim 1, wherein said memory circuit is further arranged to perform frame rate conversion after receipt of the second user-operable command.

5. The image camera as claimed in claim 1 wherein the adjustment parameter generating means comprises:
   a microprocessor for control of a memory device in the memory circuit and for control of the signal processor via the adjustment parameters independent of the memory device, and
   user-operable input control means coupled to the microprocessor by which the adjustment parameters can be modified by the camera operator.

6. The image camera as claimed in claim 5 further comprising:
   an optical lens system for the image sensor, and wherein the microprocessor generates and supplies to the optical lens system optical adjustment parameter signals under control of the user-operable input control means.

7. The image camera as claimed in claim 1 wherein
   the adjustment parameter generating means comprise a microprocessor for control of a memory device in the memory circuit independently of the electric adjustment parameters and for control of the signal processor via the electric adjustment parameters, and
   the memory device has the capacity to store a sequence of frames so that video parameters of a moving scene can be adjusted by the microprocessor to provide motion compensation.

* * * * *